United States Patent [19]

Yoshida et al.

[11] 4,219,466
[45] Aug. 26, 1980

[54] IMPACT RESISTANT RESIN CONTAINING COMPOSITIONS HAVING REDUCED FLAMMABILITY

[75] Inventors: Kazuo Yoshida, Yokohama; Kunio Fukuda, Chigasaki, both of Japan

[73] Assignee: Asahi-Dow Limited, Tokyo, Japan

[21] Appl. No.: 959,271

[22] Filed: Nov. 9, 1978

[51] Int. Cl.$^2$ .................. C08L 51/00; C08L 53/00
[52] U.S. Cl. .................. 260/45.75 B; 260/45.7 R; 260/45.95 R; 525/98
[58] Field of Search .................. 260/876 B, 45.79 B, 260/45.7 R, 45.95 G; 525/98

[56] References Cited

U.S. PATENT DOCUMENTS

| | | | |
|---|---|---|---|
| 3,494,985 | 2/1970 | Hindersinn et al. | 260/889 |
| 3,686,107 | 8/1972 | Russell | 260/27 BB |
| 3,862,068 | 1/1975 | Russel | 260/876 B |
| 4,031,166 | 6/1977 | Bronstert et al. | 260/876 B |
| 4,101,484 | 7/1978 | Doss | 260/27 BB |
| 4,145,376 | 3/1979 | Bracke et al. | 260/876 B |

*Primary Examiner*—Richard B. Turer
*Attorney, Agent, or Firm*—R. B. Ingraham

[57] ABSTRACT

A resin composition having high impact resistance, improved release property and reduced flammability is obtained by mixing a polymer containing a major amount of a monovinyl aromatic, monomer, a block copolymer consisting essentially of styrene and butadiene, an amorphous alpha-olefin polymer, a halide containing flame retardant compound, and an antimony compound.

8 Claims, No Drawings

IMPACT RESISTANT RESIN CONTAINING COMPOSITIONS HAVING REDUCED FLAMMABILITY

The present invention relates to styrene resin compositions of reduced flammability and, more specifically, to such resin compositions having a high impact resistance, improved release property and a reduced tendency to burn with absence of an external heat source. Recently, in the field of applications of styrene resins, especially in those fields associated with low-current electricity, there has been an increasingly higher demand for styrene resins of reduced flammability and various methods have been proposed to make such styrene resins which are of reduced flammability, including high impact polystyrene, styrene-acrylonitrile-butadiene, copolymers, styrene-methylmethacrylate-butadiene copolymers and so forth. As one example of such methods, it is well-known that styrene resins can be prepared that have a reduced tendency to ignite and propagate flame in the absence of an external heat source, by adding thereto an organic halide together with an inorganic flame-retardant such as antimony trioxide. However, the use of these flame-retardants, especially of those particulate or crystalline flame-retardants such as antimony trioxide which do not melt and diffuse at temperatures that styrene resins are usually worked, are likely to remarkably lower the toughness of the polymers and to aggravate desirable properties peculiar to the resins. For this reason, machines having a high mixing efficiency have been used to work such styrene resins, but no appreciable improvement has been achieved. Also, during the molding process, those styrene resins to which a flame-retardant is added exhibit much aggravated release property. This constitutes a great limitation on the improvement in the degree of freedom in designing moldings and the productivity which are advantageous features of the styrene resins and, therefore, the improvement in the release property thereof from molds has been strongly desired in the industry. Organic halides are very effective in providing the polymers with a reduced tendency to ignite and burn in the absence of an external heat source, but have a tendency to make the polymers drip while they are burning and, in order to bring the polymers to fall in the range of V-1 to V-0 provided under Subject 94 by Underwriters Laboratories Inc. (hereinafter referred to as UL), a large amount of halides must be added. It is well-known that the use of antimony compounds in combination with the halides is effective in obviating such a defect. However, even with the addition of the antimony compounds, the polymers tend to drip as the thickness of the polymer moldings becomes smaller, and it is very difficult to bring the polymers to conform to the range of V-1 to V-0 under UL 94. Thus, the solution to this problem has long been desired too.

The tests employed herein to demonstrate surpressed ignition properties and burning accurately demonstrate the ignition or burning characteristics of the polymers when exposed to small scale ignition sources according to the tests employed. It is well recognized by those skilled in this art and should be clearly understood by others, that all known organic polymers will burn when subjected to a sufficiently intense heat source whether or not they contain a fire-retardant additive.

In the meantime as a means of obtaining an improved release property of styrene resins, it is conventionally known to add higher fatty acids, their metal salts, waxes, etc. to resins. However, the addition of such materials does not remarkably improve the release property of the styrene resins to which a halide flame-retardant is added and, in addition, makes such resins more combustible and easier to drip and, as a result, degrades the reduced flammability property thereof. "To drip" or "dripping" referred to herein, according to the vertical burning test under UL 94, means to drip flaming particles from a specimen during the application of a test flame or after the removal of the flame. The objects which drip from the specimen are called flaming particles.

The inventors have conducted a series of intensive studies to overcome the aforementioned shortcomings and succeeded in obtaining a resin composition having a remarkably improved impact resistance and release property as well as significantly reduced tendency to ignite or propagate flame in the absence of an external heat source by adding under kneading a block copolymer consisting essentially of styrene and butadiene (hereinafter referred to as SB block copolymer) and an amorphous alpha-olefin polymer and/or copolymer (hereinafter referred to as amorphous alpha-olefin polymer) to a polymer obtained from a major amount of a monovinyl aromatic monomer (hereinafter referred to as styrene resin) simultaneously with a halide flame-retardant and antimony compound which are added to provide a polymer having a reduced tendency to ignite or propagate flame in the absence of an external heat source, or after the process of making the polymer with a reduced tendency to ignite with the addition of the latter. Further advantageously, it has been found that the resin composition according to the present invention can be processed into very thin moldings with a reduced tendency to ignite and propagate flame in the absence of an external heat source well satisfying the UL 94 and without causing dripping.

According to the present invention, a simple polymer of aromatic monovinyl compound or a graft copolymer obtained by copolymerizing an aromatic monovinyl compound with a rubber polymer may be used as the base resin.

The aromatic monovinyl compounds herein referred to include styrene, alpha-methylstyrene, nucleus-substituted methylstyrene, nucleus-substituted ethylstyrene, nucleus-substituted butylstyrene, bromostyrene, and derivatives thereof. The rubber polymer herein referred to may be any polymers generally exhibiting rubber-like properties, including conjugated diolefin polymers or copolymers such as polybutadiene and styrene-butadiene copolymer, rubber-like olefin copolymers such as ethylene-propylene copolymer, and rubber-like alkyl acrylate polymer or copolymer, etc. Typical examples of base resins comprising the aforementioned compositions are polystyrene and high-impact polystyrene.

According to the present invention, it is essential to add to the base resin a SB block copolymer together with an amorphous alpha-olefin polymer. Although it is well-known that the impact resistance of polystyrene and high-impact polystyrene can be improved by adding thereto a SB block copolymer, the inventors have obtained an unexpected finding that adding a SB block copolymer to polystyrene of reduced flammability or high-impact polystyrene obtained by addition thereto of a halide flame-retardant or antimony compound simultaneously with the addition of said flame-retardant or succeeding thereto not only improves the impact resistance considerably as compared with the case in which the SB block copolymer is added to polystyrene or high-impact polystyrene without addition of the flame-retardant compound, but also results in the prevention of the aforesaid dripping and improvement in the flame retardance, as far as the added quantity thereof is proper.

However, if the SB block copolymer is added singly, the release property of the resin from the mold used in the molding process remains at a lower level and the resin composition cannot be used satisfactorily as far as its practical application is concerned. If fatty acids, their metal salts or waxes are added thereto to improve the release property, not only the desired improvement is not achieved, but also the effect of preventing the dripping achieved by the addition of the SB block copolymer will be aggravated. The inventors have found that the addition of an amorphous alpha-olefin polymer to the resin instead of those releasing agents as mentioned above can result in a desired release property without adversely affecting the dripping prevention effect, and, more advantageously, improve the impact resistance of the resin. Thus, the present invention based on the aforementioned finding can provide an excellent resin composition.

The SB block copolymers used in the resin composition according to the present invention may include those copolymers which are obtained by copolymerizing other olefins and/or diolefins with the styrene-butadiene block copolymers in addition to the latter copolymers. Most preferably, the ratio of styrene to butadiene of the styrene-butadiene block copolymer should be 10-70 percent by weight to 90-30 percent by weight, with the average molecular weight thereof ranging from 10,000 to 500,000.

The amorphous alpha-olefin polymer used in the resin composition according to the present invention may be any of those alpha-olefin polymers which have almost no crystallinity such as atactic polypropylene, atactic polyethylene, ethylene-propylene copolymer, ethylene-propylene-conjugated diolefin copolymer, propylene-butadiene copolymer, and so forth. Among these, particularly preferable is an amorphous alpha-olefin polymer with the molecular weight of the ethylene-propylene copolymer thereof ranging from 10,000 to 500,000.

The halide flame-retardants used according to the present invention may be any of well-known agents, including decabromodiphenyl ether, tetrabromobisphenol A, hexabromobenzene, hexabromocyclododecane, tris (2,3-dibromopropyl) phosphate, and the like.

The antimony compounds used according to the present invention include antimony trioxide, antimony pentoxide, antimony trichloride, antimony trisulfide, and the like.

As to the ratio of the components of the resin composition of the present invention, it is preferable to mix 1-10 parts by weight of SB block copolymer, 0.2-10 parts by weight of amorphous alpha-olefin polymer, 1-40 parts by weight of halide flame-retardant and 0.5-15 parts by weight of antimony compound per 100 parts by weight of styrene resin. According to the present invention, the content of SB block copolymer is limited to the range of 1-10 parts by weight, because the addition thereof below 1 part by weight hardly improves the impact resistance and reduced flammability while the addition thereof above 10 parts by weight deteriorates the reduced flammability of the resin. That is to say, the SB block copolymer as added in the aforementioned range best contributes to the improvement in the reduced flammability as well as the impact resistance. Also, the content of the amorphous alpha-olefin polymer is limited to the range of 0.2-10 parts by weight according to the present invention, because the content thereof below 0.2 parts by weight hardly improves the release property of the resin, while the content thereof above 10 parts by weight deteriorates the flammability characteristics of the resultant resin composition. The contents of the halide flame-retardant and antimony compound as well as the ratio of halogen and antimony according to the present invention may fall in any of well-known ranges. However, the contents thereof below a certain lower limit level cannot bring forth an adequate reduction in flammability while the resin properties will be remarkably degraded with contents thereof exceeding a certain higher limit.

In mixing the aforementioned components, an intended kneaded mixture may be obtained by first mixing the component materials by an ordinary mixing machine such as a mixer, drum blender or kneader and, then, kneading the mixture through an extruder or melt-kneading the same through a heating roll, Banbury mixer or other suitable means. In this case, a coloring agent, plasticizer, stabilizer, ultraviolet absorber, foaming agent, inorganic reinforcing agent and/or other additives which do not adversely affect the resin composition according to the present invention may be added in a suitable amount, respectively, as required.

Hereinafter, the present invention will be described further in detail by way of the preferred embodiments thereof and comparative examples.

In testing those preferred embodiments and comparative examples, the resin properties were evaluated in the following manner:

(1) Tensile strength (Kg/cm$^2$): According to JIS-6781.
(2) Izod impact strength (Kg-cm/cm): According to JIS-K6781.
(3) Vicat softening point (°C.): According to ASTM D1525.
(4) Reduced flammability: According to the vertical burning test method provided under UL 94, specimen thickness: 1/16 inch.
(5) Release property (in-lbs.): Resins were injection-molded into cap-like products and a torque meter was used to measure the easiness of releasing the products from the mold.

Preferred embodiments No. 1-9

Styron 683 (trademark for a polystyrene) Styron 492 (trademark for a high-impact polystyrene owned by Asahi-Dow Limited) as a styrene resin, decabromodiphenyl ether or hexabromobenzene as a flame-retardant, antimony trioxide as an antimony compound, Tufprene (trademark for a block SBR product owned by Asahi Chemical Industry Co., Ltd.,) Califlex 2109 (trademark owned by Shell Kagaku K. K. or Solprene 414 (trademark owned by Japan Elastomer Co., Ltd.) as a SB block copolymer, and Tafmer P-0680 (trademark for an ethylene-propylene copolymer product owned by Mitsui Petrochemical Industries, Ltd.) or Mitsui EPD-3045 (trademark for an ethylene-propylene-conjugated diene copolymer owned by Mitsui Petrochemical Industries, Ltd.) as an amorphous alpha-olefin copolymer were mixed in a drum blender in accordance with the combinations and ratios as shown in Table 1, respectively, and the resultant mixtures were then subjected to a melt kneading through an extruder to obtain pellet-like resin compositions. The resin properties were measured as to each of the resultant resin compositions. The observations and test results are also given in Table 1.

Table 1

|  |  | Preferred embodiments | | | | | | | | |
|---|---|---|---|---|---|---|---|---|---|---|
|  |  | 1 | 2 | 3 | 4 | 5 | 6 | 7 | 8 | 9 |
| Resin composition (parts by weight) | Styrene resin[1] | Styron 683 100 | 100 | 100 | 100 | 100 | 100 | 100 | 100 | 100 |
|  | Flame-retardant[2] | 13 | 13 | 13 | 13 | 13 | 13 | 13 | 13 | Hexabromobenzene 13 |
|  | SB block[3] copolymer | 10 | 5 | 2 | 5 | 2 | Califlex 2109 5 | Solprene 411 5 | 5 | 5 |
|  | Alpha-olefin[4] polymer | 1 | 1 | 1 | 0.5 | 5 | 1 | 1 | Mitsui EPT 3045 1 | 1 |
| Resin properties | Tensile strength | 510 | 260 | 265 | 260 | 260 | 255 | 265 | 255 | 255 |
|  | Izod impact strength | 2.5 | 7.6 | 6.6 | 7.5 | 7.2 | 7.5 | 7.7 | 7.5 | 7.5 |
|  | Vicat softening point | 103 | 99 | 100 | 99 | 99 | 97 | 99 | 99 | 98 |
|  | Flame retardancy | V-1 | V-1 | V-1 | V-1 | V-1 | V-1 | V-1 | V-1 | V-1 |
|  | Release[5] property | 28 | 28 | 28 | 32 | 24 | 28 | 28 | 29 | 28 |

Notes:
[1] Except for the preferred embodiment No. 1, Styron 492 was used as styrene resin.
[2] Except for the preferred embodiment No. 9, decabromodiphenyl ether was used as flame-retardant.
[3] Except for the preferred embodiment Nos. 6 and 7, Tufprene was used as SB block copolymer.
[4] Except for the preferred embodiment No. 8, Tafmer P-0680 was used as alpha-olefin copolymer.
[5] As to the release property, the smaller the values are, the better the property is.

Table 2

|  |  | Comparative examples | | | | | | | | | |
|---|---|---|---|---|---|---|---|---|---|---|---|
|  |  | 1 | 2 | 3 | 4 | 5 | 6 | 7 | 8 | 9 | 10 |
| Resin composition (parts by weight) | Styrene[1] resin | Styron 683 100 | Styron 683 100 | 100 | 100 | 100 | 100 | 100 | 100 | 100 | 100 |
|  | Decabromodiphenyl ether | — | 13 | — | — | 13 | 13 | 13 | 13 | 13 | 13 |
|  | Antimony trioxide | — | 5 | — | — | 5 | 5 | 5 | 5 | 5 | 5 |
|  | Tufprene | — | 10 | — | 3 | — | 3 | 2 | 2 | 15 | 2 |
|  | Release agent | — | Calcium stearate 2 | — | — | — | — | Calcium stearate 2 | Stearic acid 2 | Tafmer 0.5 | Tafmer 15 |
| Resin properties | Tensile strength | 550 | 500 | 340 | 275 | 280 | 265 | 260 | 260 | 240 | 250 |
|  | Izod impact strength | 1.2 | 2.3 | 6.6 | 7.1 | 4.5 | 6.6 | 6.3 | 6.3 | 9.3 | 6.4 |
|  | Vicat softening point | 105 | 101 | 105 | 102 | 101 | 100 | 98 | 97 | 96 | 98 |
|  | Flame retardancy | HB | V-2 | HB | HB | V-2 | V-1 | V-2 | V-2 | HB | HB |
|  | Release property | 70 | 45 | 65 | 55 | 75 | 60 | 43 | 49 | 30 | 20 |

Note:
[1] Except for the preferred embodiment Nos. 1 and 2, Styron 492 was used as styrene resin.

Comparative examples No. 1–10

In the same manner as the aforementioned preferred embodiments, Styron 683 or Styron 492 as a styrene resin, decabromodiphenyl ether as a flame-retardant and 5 parts by weight antimony trioxide as antimony compound were mixed and kneaded by adding thereto stearic acid or calcium stearate in some cases, in accordance with the combinations and ratios as shown in Table 2, consequently to obtain resin compositions. The comparative examples No. 9 and 10 show cases in which Tufprene and Tafmer were added by an amount exceeding a proper level, respectively. The resin properties were measured for each of the resultant resin compositions. The observations and test results are also given in Table 2.

As clearly seen from the comparative examples shown in Table 2, the addition of a flame-retardant to high-impact polystyrene (comparative example No. 3) remarkably lowered the impact resistance of the resin (comparative example No. 5). However, a further addition thereto of a suitable amount of a block SBR resulted in an improvement in impact resistance and reduced ignition and flammability property (comparative example No. 6). In this case, the improvement in the impact resistance was more remarkable in the resin which was rendered less ignitable and less flammable than the resin that was not made less ignitable and less flammable (comparative example No. 4). Since singly adding the block SBR did not improve the release property, stearic acid or calcium stearate that had been used as a release agent from the past was further added. However, not only the reduced tendency to burn was deteriorated, but also an adequate release property could not be achieved (comparative examples No. 2, 7 and 8). Further, even with the combination of the block SBR according to the present invention with an amorphous alpha-olefin polymer, the addition thereof by a quantity exceeding a proper level is not desirable in that such an excessive addition increased the tendency of the polymer to burn (comparative examples No. 9 and 10).

Thus, it is obvious that the resin compositions according to the present invention as shown in Table 1 are much superior to the comparative examples representative of the prior art resin compositions in all respects including the impact resistance, reduced tendency of the polymer to ignite and propagate flame in the absence of an external heat source.

What is claimed is:

1. A resin composition having a high impact resistance, improved release property and a reduced tendency to ignite and to propagate flame in the absence of an external heat source obtained by mixing a polymer obtained from a major amount of a monovinyl aromatic monomer, a block copolymer consisting essentially of styrene and butadiene, an amorphous alpha-olefin polymer or copolymer, a flame retarding quantity of a halide flame-retardant and an antimony compound said composition comprising 100 parts by weight of said polymer obtained from a major amount of a monovinyl aromatic monomer, 1 to 10 parts by weight of said copolymer consisting essentially of styrene and butadiene, and 0.2 to 10 parts by weight of said amorphous alpha-olefin polymer or copolymer.

2. The resin composition according to claim 1, wherein said polymer obtained from a monovinyl aromatic monomer is polystyrene.

3. The resin composition according to claim 1, wherein said polymer obtained from a monovinyl aromatic monomer is a polymer obtained by a graft copolymerization of the monovinyl aromatic monomer with a rubber polymer.

4. The resin composition according to claim 1, wherein said block copolymer consists essentially of styrene and butadiene.

5. The resin composition according to claim 4, wherein the molecular weight of said styrene-butadiene copolymer ranges from 10,000 to 500,000.

6. The resin composition according to claim 4, wherein the ratio styrene to butadiene of said styrene-butadiene copolymer is from 10:70 parts by weight to 90:30 parts by weight.

7. The resin composition according to claim 1, wherein said amorphous alpha-olefin polymer is an ethylene-propylene copolymer.

8. The resin composition according to claim 7, wherein the molecular weight of said ethylene-propylene copolymer ranges from 10,000 to 500,000.

* * * * *